United States Patent
Thompson et al.

(10) Patent No.: US 9,746,873 B2
(45) Date of Patent: Aug. 29, 2017

(54) DISENGAGING HANDLE ASSEMBLY FOR A BOTTOM OUTLET VALVE

(71) Applicant: Union Tank Car Company, Chicago, IL (US)

(72) Inventors: Nicholas Thompson, Chicago, IL (US); Gary C. Walter, Chicago, IL (US); Peter J. Douglas, Schereville, IN (US)

(73) Assignee: Union Tank Car Company, Chicago, IL (US)

( * ) Notice: Subject to any disclaimer, the term of this patent is extended or adjusted under 35 U.S.C. 154(b) by 61 days.

(21) Appl. No.: 14/213,407

(22) Filed: Mar. 14, 2014

(65) Prior Publication Data

US 2014/0261072 A1    Sep. 18, 2014

Related U.S. Application Data

(60) Provisional application No. 61/791,906, filed on Mar. 15, 2013.

(51) Int. Cl.
| | |
|---|---|
| *G05G 1/08* | (2006.01) |
| *B61D 5/00* | (2006.01) |
| *F16K 31/46* | (2006.01) |
| *F16K 31/60* | (2006.01) |
| *F16K 35/02* | (2006.01) |
| *F16K 35/06* | (2006.01) |

(52) U.S. Cl.
CPC .............. *G05G 1/08* (2013.01); *B61D 5/00* (2013.01); *F16K 31/46* (2013.01); *F16K 31/602* (2013.01); *F16K 35/02* (2013.01); *F16K 35/06* (2013.01); *Y10T 74/20474* (2015.01); *Y10T 137/6855* (2015.04); *Y10T 137/7043* (2015.04)

(58) Field of Classification Search
CPC .......... F16K 31/44; F16K 31/46; F16K 31/60; F16K 31/602; Y10T 137/20474; Y10T 137/6855; Y10T 137/7043; G05G 1/08; G05G 1/04; B61D 5/00
USPC ....... 251/95, 96, 98, 99, 101, 292, 291, 293; 137/377, 899
See application file for complete search history.

(56) References Cited

U.S. PATENT DOCUMENTS

| | | | | |
|---|---|---|---|---|
| 1,996,351 | A * | 4/1935 | Schultz ................... | F16K 31/44 251/244 |
| 3,010,346 | A * | 11/1961 | Kulp ....................... | B25B 13/48 81/124.2 |
| 3,314,444 | A * | 4/1967 | White, Jr. ................ | F16K 1/22 105/248 |
| 3,827,671 | A * | 8/1974 | Bolden .................... | F16K 5/06 251/172 |
| 3,930,634 | A * | 1/1976 | Loveless ................. | F16K 35/02 251/96 |

(Continued)

*Primary Examiner* — Kevin Murphy
*Assistant Examiner* — Kelsey Rohman
(74) *Attorney, Agent, or Firm* — Banner & Witcoff, Ltd.

(57) ABSTRACT

A handle assembly for an outlet valve for a tank, where the outlet valve has a coupler that is actuated to open and close the outlet valve, is provided. The handle assembly includes a handle with a shaft attached to the handle. The shaft has a tip. A bracket is adapted to mount the shaft to the tank so that the shaft is pivotally mounted with respect to the tank and movable with respect to the outlet valve between an engaged position, where the tip of the shaft engages the coupler, and a disengaged position, where the tip of the shaft is disengaged from the coupler.

20 Claims, 20 Drawing Sheets

(56) References Cited

U.S. PATENT DOCUMENTS 4,212,447 A * 7/1980 Behle ..................... F16K 27/07
251/144
4,292,858 A * 10/1981 Lipshield ................ B60T 7/104
74/501.6
6,260,932 B1 * 7/2001 Tinklepaugh ......... B60T 17/043
251/293

* cited by examiner

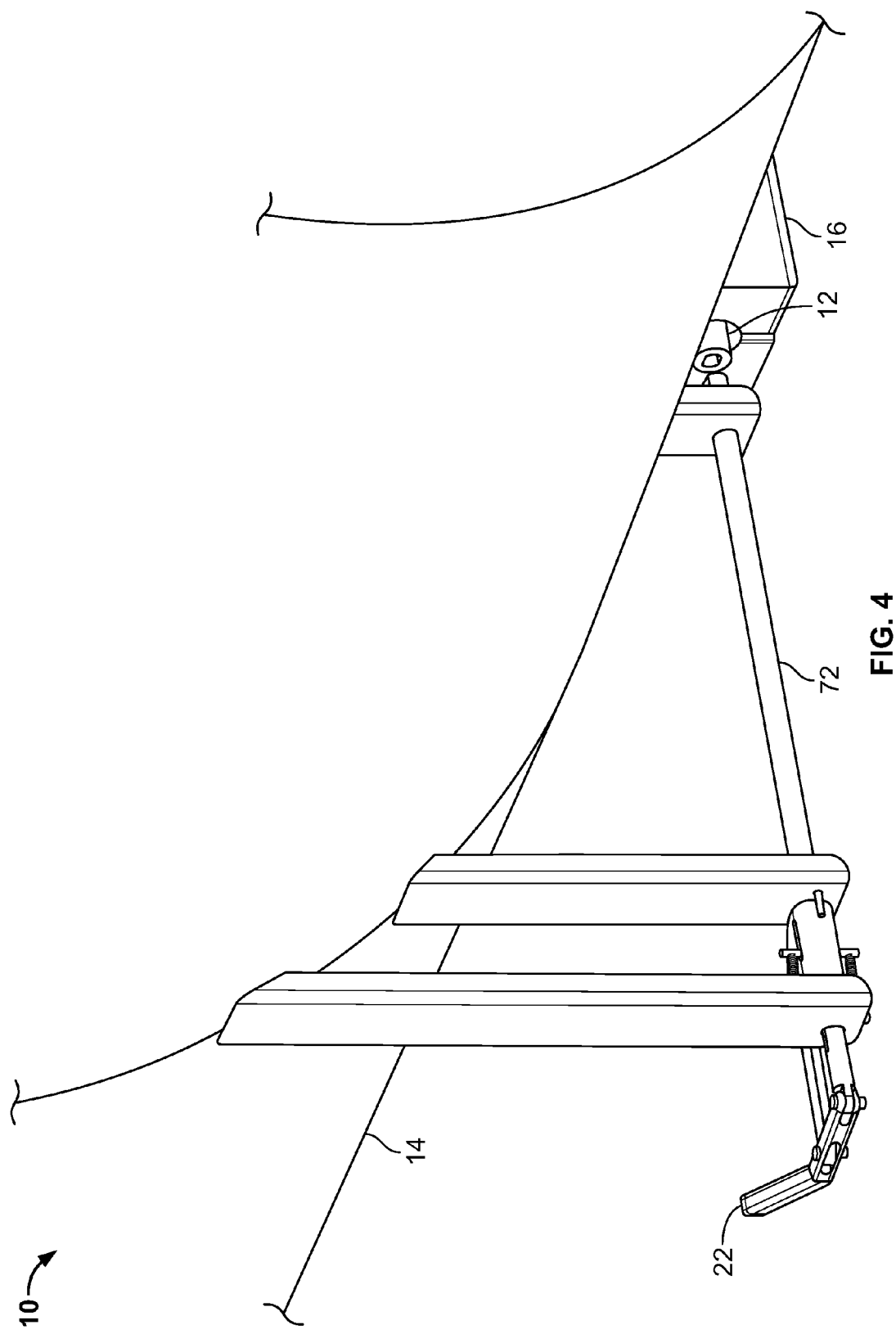

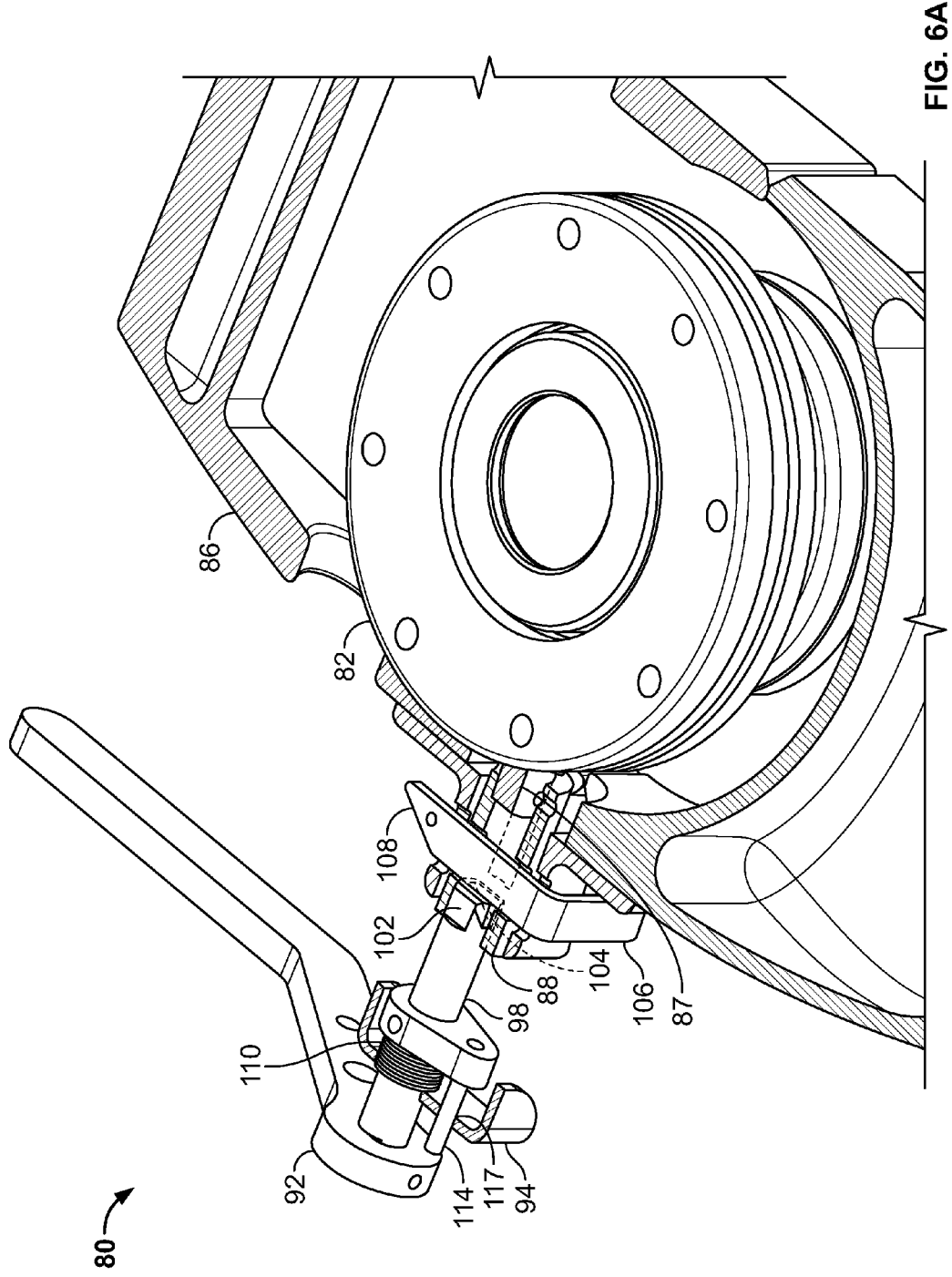

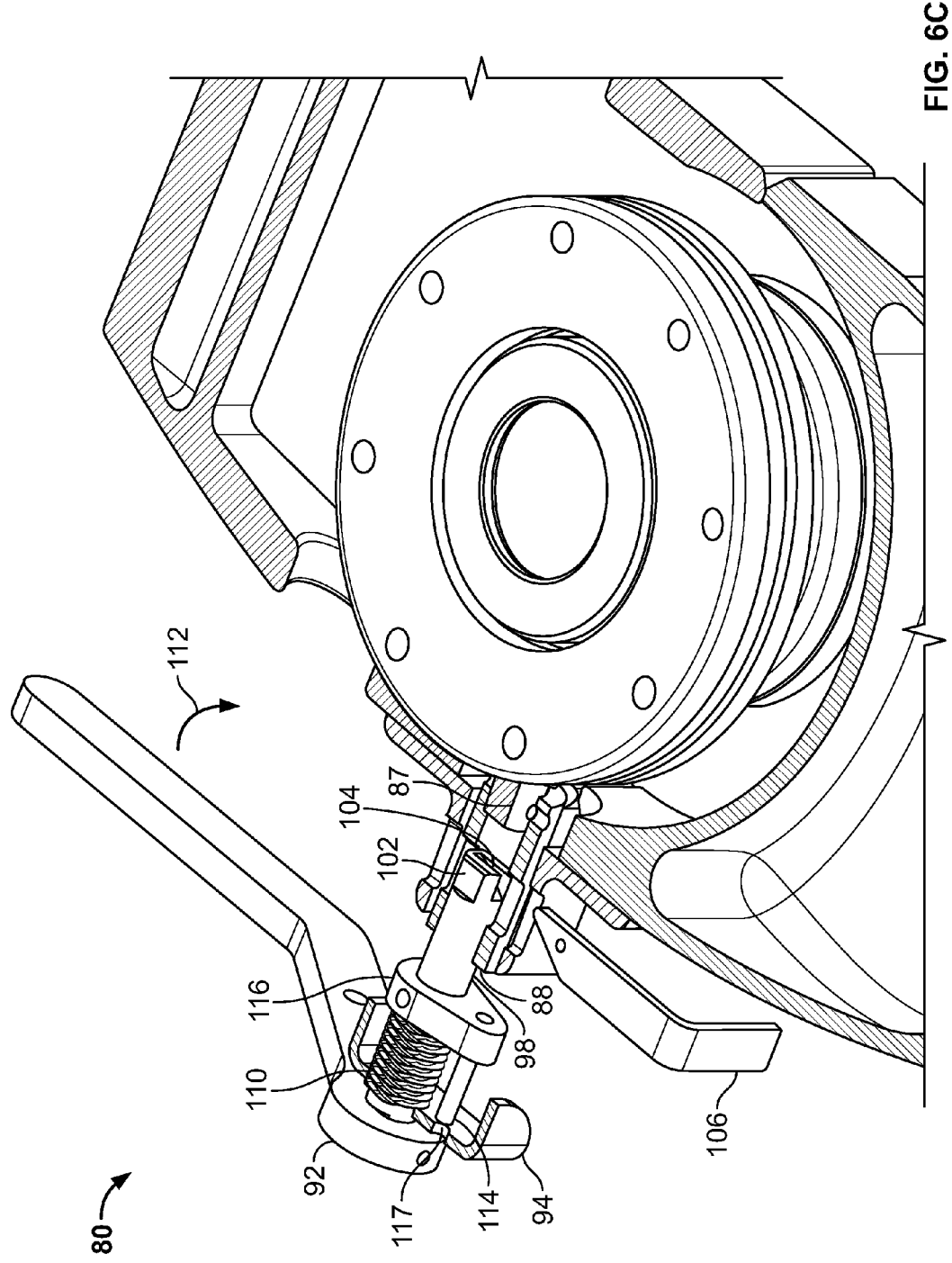

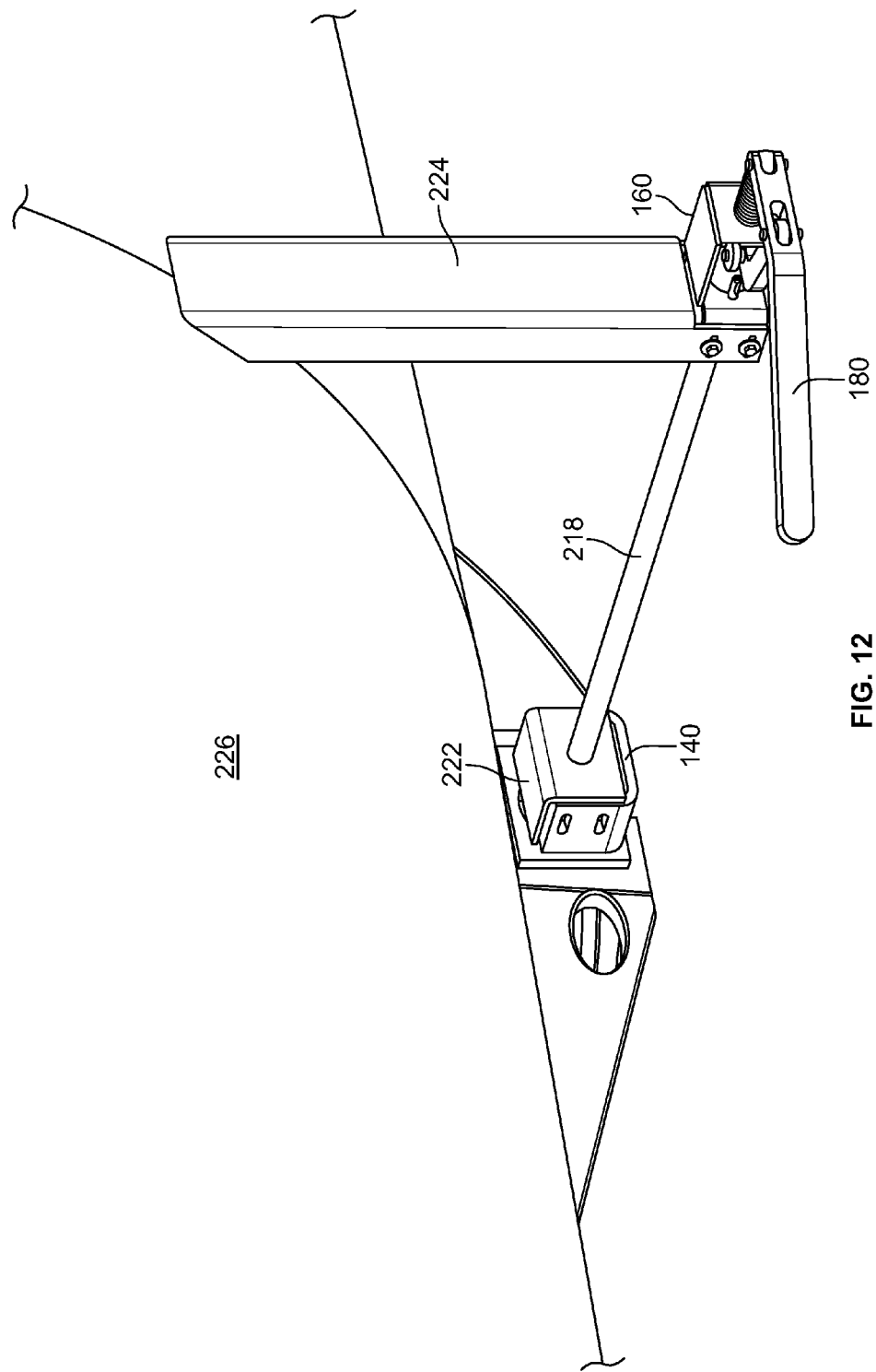

DISENGAGING HANDLE ASSEMBLY FOR A BOTTOM OUTLET VALVE

CLAIM OF PRIORITY

This application claims priority to provisional patent application No. 61/791,906, filed Mar. 15, 2013.

FIELD OF THE INVENTION

The present invention relates generally to tank transport vehicles and, more specifically, to a disengaging handle assembly for the bottom outlet valve of a tank.

BACKGROUND

Railroad tank cars are often equipped with bottom outlet valves (BOVs) to permit easy offloading of the cargo being hauled in the tank car. Such BOVs are typically ball valves that are positioned on the bottom of the tank of the tank car and in communication with the interior of the tank. The BOV remains closed while the tank is being loaded and during transit. Upon arrival at the offloading location, the BOV is opened so that the cargo drains or otherwise flows out of the tank through the BOV.

Handles are usually used to open and close BOVs. Prior art designs include a variety of standard (direct) handles and remote handles that remain attached to the BOV.

Tank cars equipped with BOVs are susceptible to leaks when the BOV operating handle inadvertently operates the BOV during train movement or accidents. For example, a BOV handle could move to the open position due to vibration during transportation or forces and/or deformation generated by an accident.

A need therefore exists for a disengaging bottom outlet valve handle that eliminates the mechanical connection between the operating handle and the BOV when the BOV is not being opened or closed, preventing any force on the operating handle from inadvertently opening the BOV during train (or other vehicle) movement or accidents.

BRIEF DESCRIPTION OF THE DRAWINGS

FIG. 4 is a top side perspective view of a side remote-operated version of the disengaging handle assembly of FIGS. 1-3C;

FIGS. 6A-6D are top perspective views of the disengaging handle assembly of FIG. 5 in the disengaged, partially engaged (with BOV closed), engaged (with BOV closed) and engaged (with BOV open) configurations, respectively;

FIG. 12 is a top side perspective view of a side remote-operated version of the disengaging handle assembly of FIGS. 7-11C;

DETAILED DESCRIPTION OF EMBODIMENTS

A first embodiment of the disengaging handle assembly of the invention is indicated in general at 10 in FIGS. 1-4. While the invention is described below in terms of use on a railroad tank car, it may be mounted on and used with any vehicle-mounted tank used to transport cargo.

Figure 1:
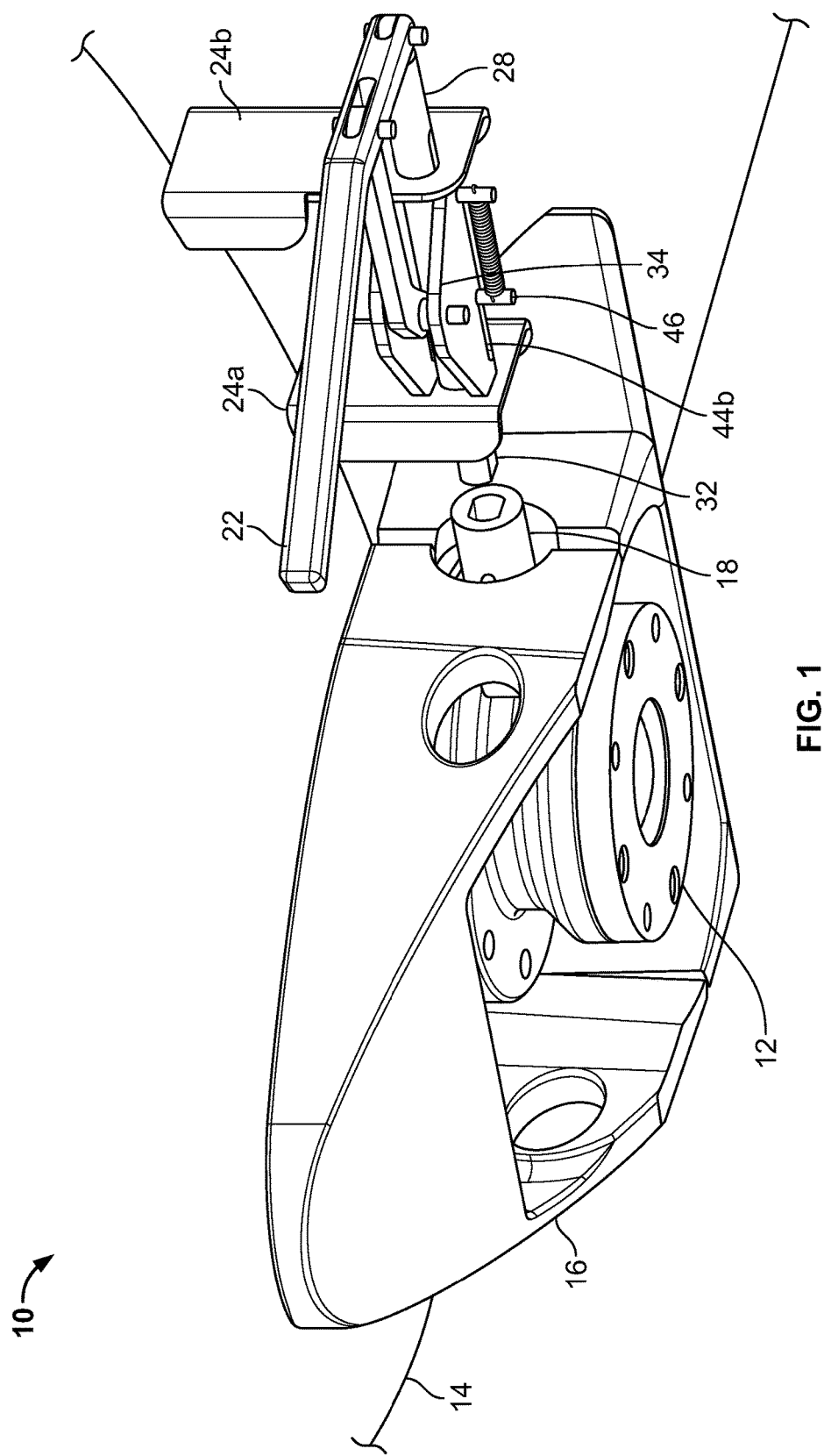
FIG. 1 is a bottom perspective view of a first embodiment of the disengaging handle assembly of the invention in a disengaged configuration.

As illustrated in FIG. 1, and as known in the art, a bottom outlet valve (BOV) 12 is attached to the bottom of the tank 14 of a railroad tank car. A skid 16 is positioned so as to surround and protect the BOV. The BOV includes a valve stem that is provided with a BOV coupler 18.

Figure 2:
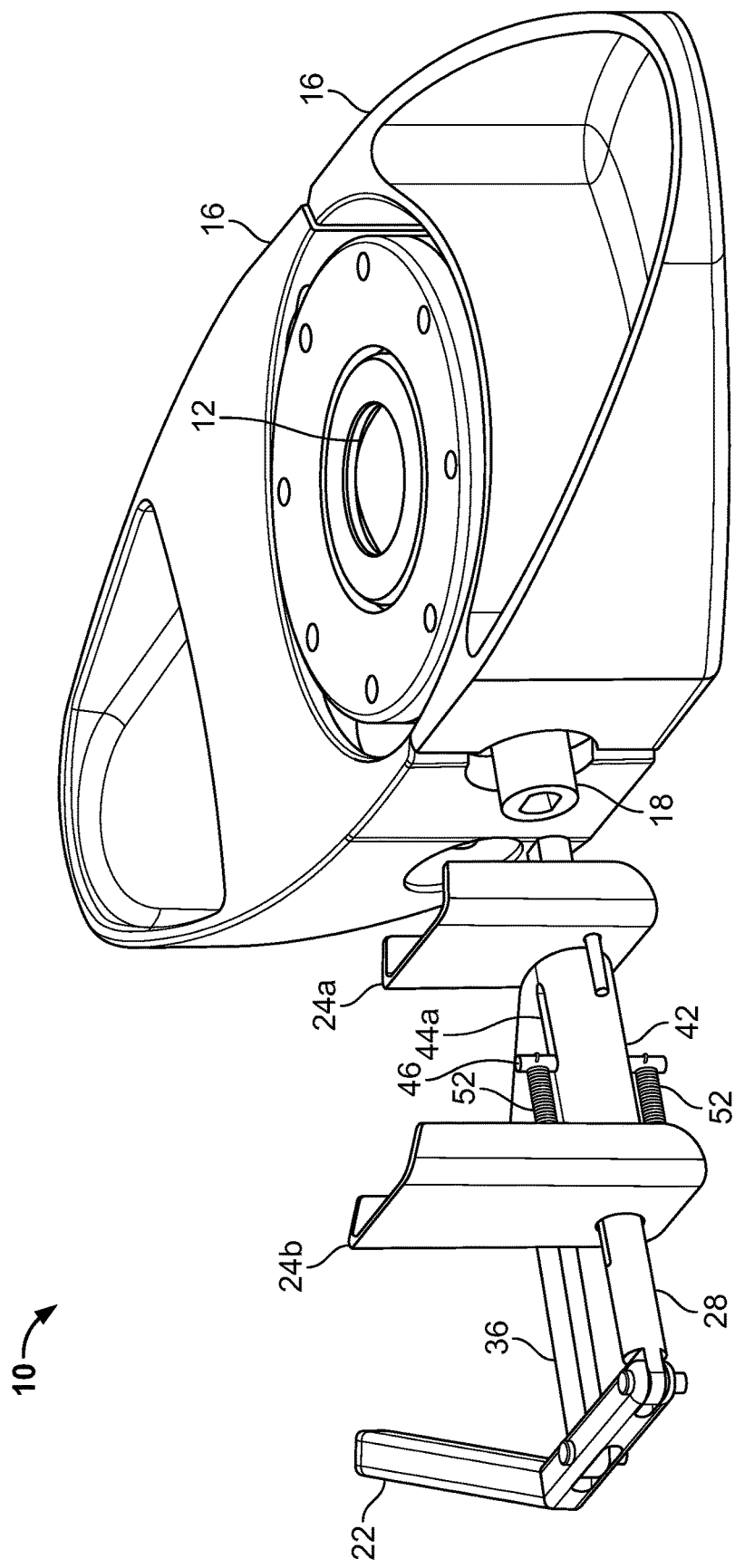
FIG. 2 is a top perspective view (with the tank omitted) of the disengaging handle assembly of FIG. 1.
Figure 3A:
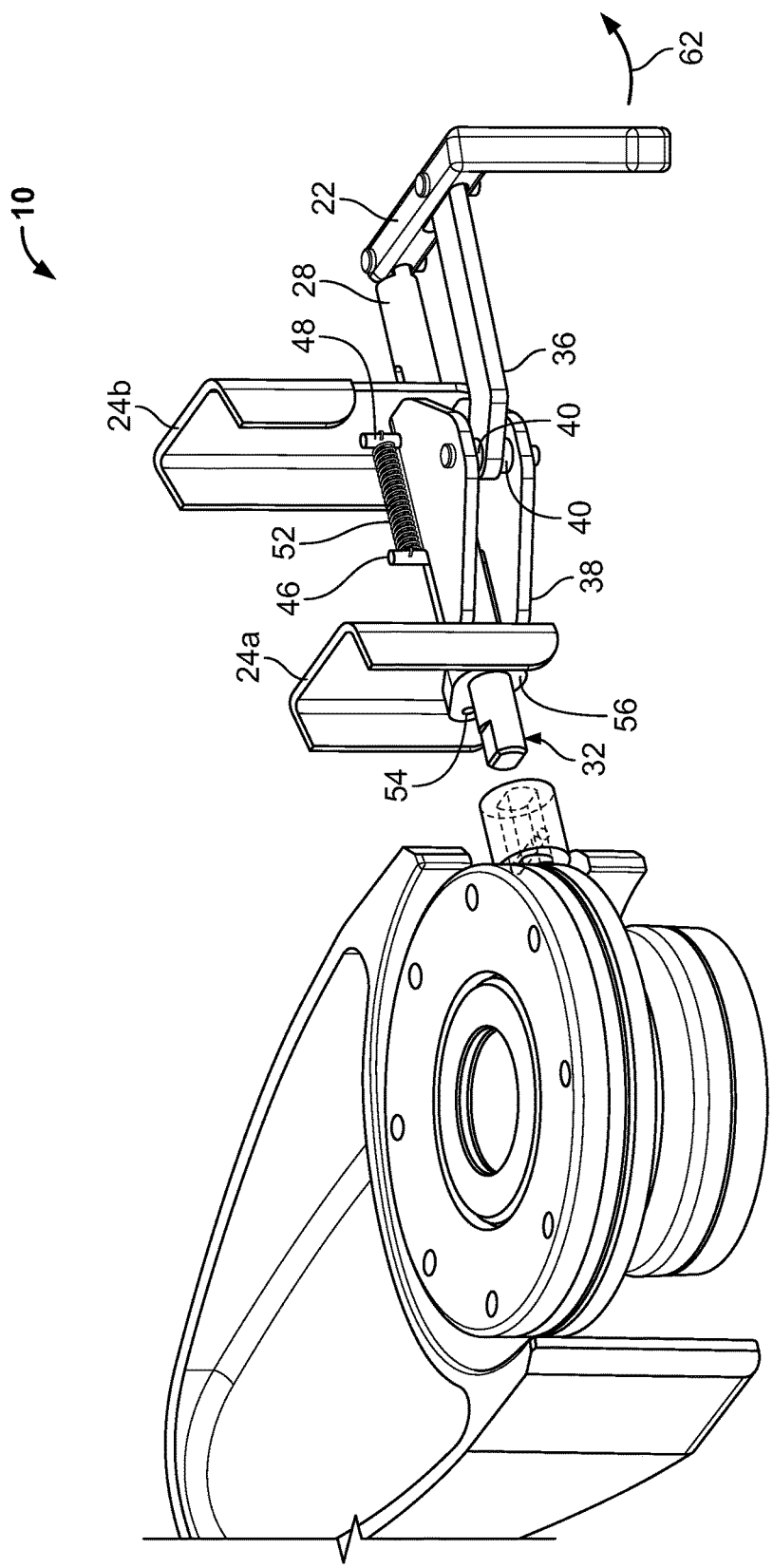
FIGS. 3A-3C are top perspective views of the disengaging handle assembly of FIGS. 1 and 2 in the disengaged, engaged (with BOV closed) and engaged (with BOV open) configurations, respectively.
Figure 3B:
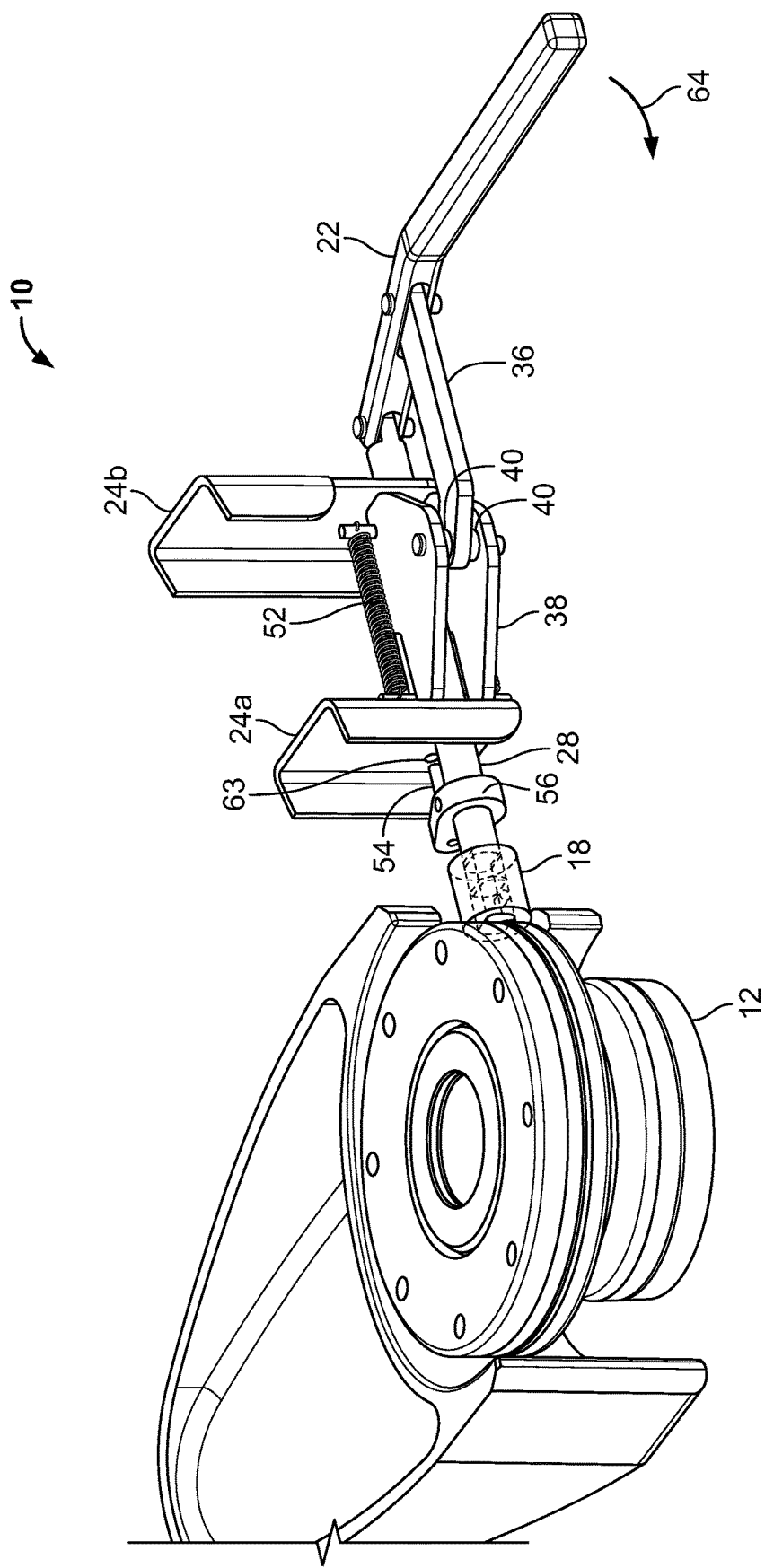

As illustrated in FIGS. 1 and 2, the first embodiment of the disengaging handle assembly 10 includes a handle 22 that is pivotally attached to the bottom of the tank by bracket members 24a and 24b. The handle 22 is pivotally attached to the distal end of a shaft 28. The proximal end of the shaft is provided with a tip 32 that is sized and shaped to removably engage the coupler 18, as explained below. A four-bar linkage 34 is built into the handle to engage and disengage the handle from the BOV, as will also be explained below. The four-bar linkage includes a proximal portion of the handle 22, a portion of the shaft 28, a link 36 and a collar 38. As illustrated in FIGS. 3A and 3B, the link 36 is pivotally attached at one end between the opposing plates of collar 38 by bushings 40 and at the other end to handle 22.

Shaft 28 pivots within and slides horizontally through brackets 24a and 24b under the control of handle 22. The collar 38 includes a U-shaped portion 42 that is positioned between brackets 24a and 24b. The U-shaped portion of the collar features a pair of slots 44a (FIG. 2) and 44b (FIG. 1). A pin 46 passes through the shaft in a fixed fashion and extends through slots 44a and 44b. As illustrated in FIG. 3A, collar 38 is also provided with a pin 48, and a pair of extension springs 52 extend between pins 46 and 48 so as to urge the disengaging handle assembly 10 into the disengaged configurations illustrated in FIGS. 1, 2 and 3A.

Figure 3C:
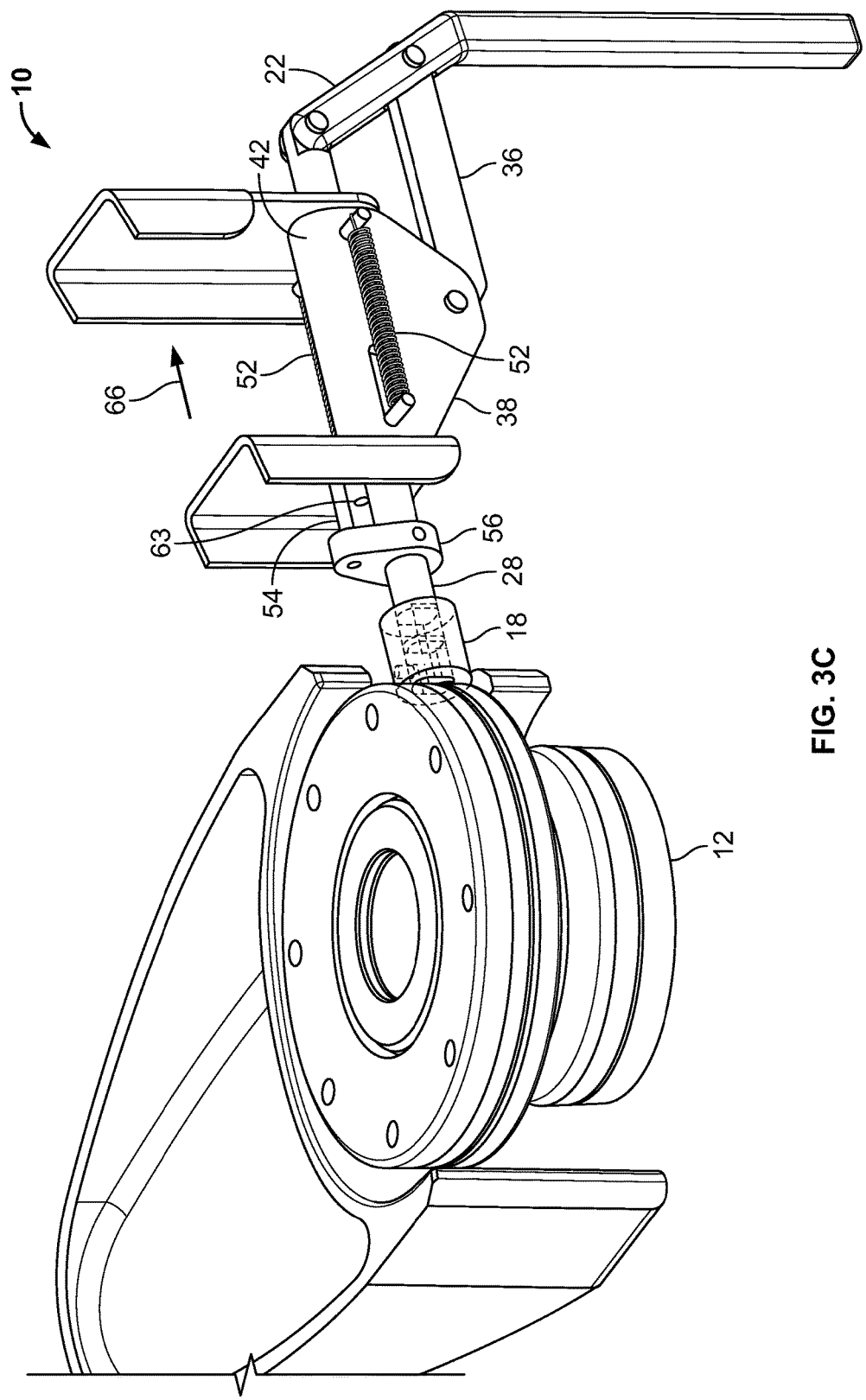

As illustrated in FIGS. 3A-3C, a locator pin 54 is attached to the shaft 28 by locator pin holder 56 so as to turn with the shaft 28.

Use of the disengaging handle assembly 10 will now be explained with regard to FIGS. 3A-3C. Starting with the disengaging handle assembly 10 in the disengaged configuration of FIG. 3A (and FIGS. 1 and 2), where the BOV is in the closed condition, the operator pulls on the handle 22, in the direction of arrow 62 of FIG. 3A, which pushes the tip 32 of the shaft into the BOV coupler 18, engaging the handle with the valve. More specifically, the handle is engaged when flats ground into the tip 32 of the shaft are inserted into a matching hole in the BOV coupler 18. As a result, the disengaging handle assembly is in the engaged configuration illustrated in FIG. 3B. The BOV is still closed at this time. In addition, as illustrated in FIG. 3B, the locator pin 54 has been removed from its corresponding hole 63 formed in the bracket 24a.

Next, the operator turns the handle generally 90° counter-clockwise, as illustrated by arrow 64 in FIG. 3B, opening the BOV. The handle is now in the position illustrated in FIG. 3C. The locator pin 54 attached to the shaft 28 ensures that the tip of the shaft of the handle assembly cannot be disengaged from the BOV coupler 18 unless the BOV is closed, preventing the operator from accidentally leaving the BOV open during train movement. More specifically, with reference to FIG. 3C, the locator pin 54 is out of alignment with the locator pin hole 63 so that the shaft is prevented from moving in the direction of arrow 66.

The locator pin 54, which is secured within the locator pin hole 63 when the handle assembly 10 is in the configuration of FIGS. 1, 2 and 3A, also prevents the handle from rotating during train movement.

The two extension springs 52 (which, as noted above, are attached between pins on the shaft and the collar) pull the handle to its default, disengaged position (FIGS. 1, 2 and 3A) once the handle 22 is pivoted back into the position of FIG. 3B, the locator pin 54 is aligned with its hole 63 on the mounting bracket and the BOV is closed.

As illustrated in FIG. 4, the embodiment of FIGS. 1-3C can be converted to a remote-operated handle by providing the disengaging handle assembly 10 with an extended shaft 72 so that the handle is accessible from the side of the tank car.

Figure 5:
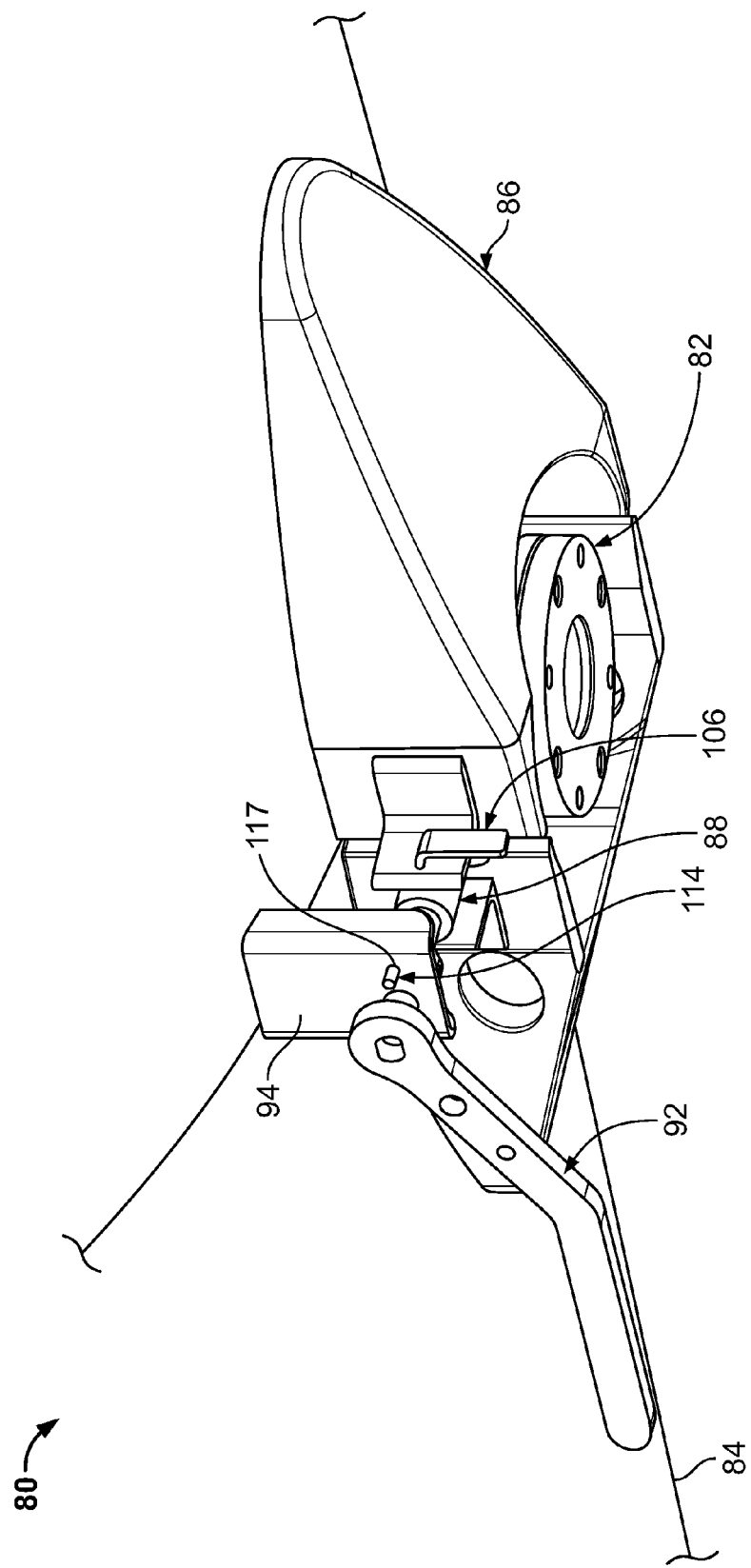
FIG. 5 is a bottom perspective view of a second embodiment of the disengaging handle assembly of the invention in a disengaged configuration.
Figure 6B:
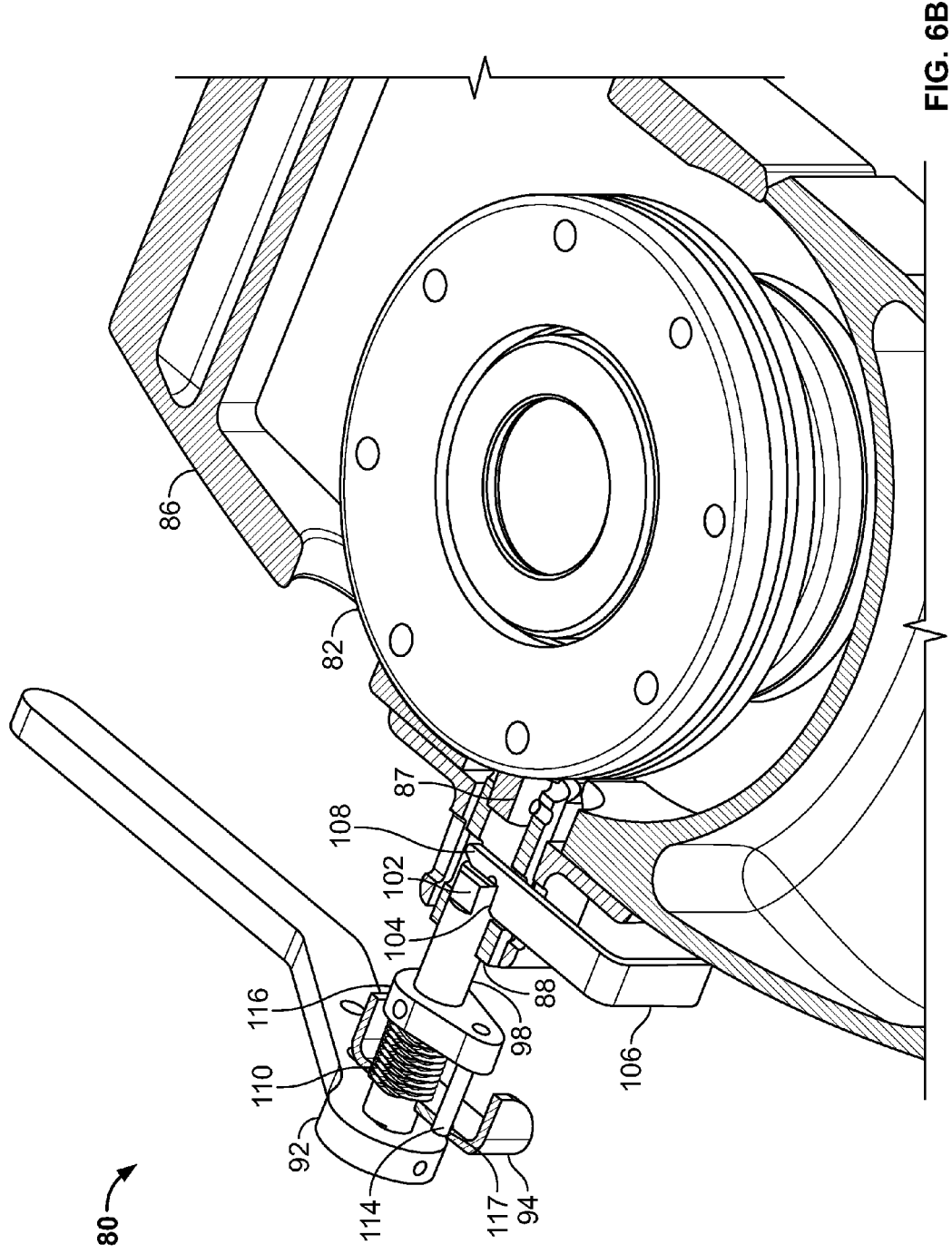
Figure 6D:
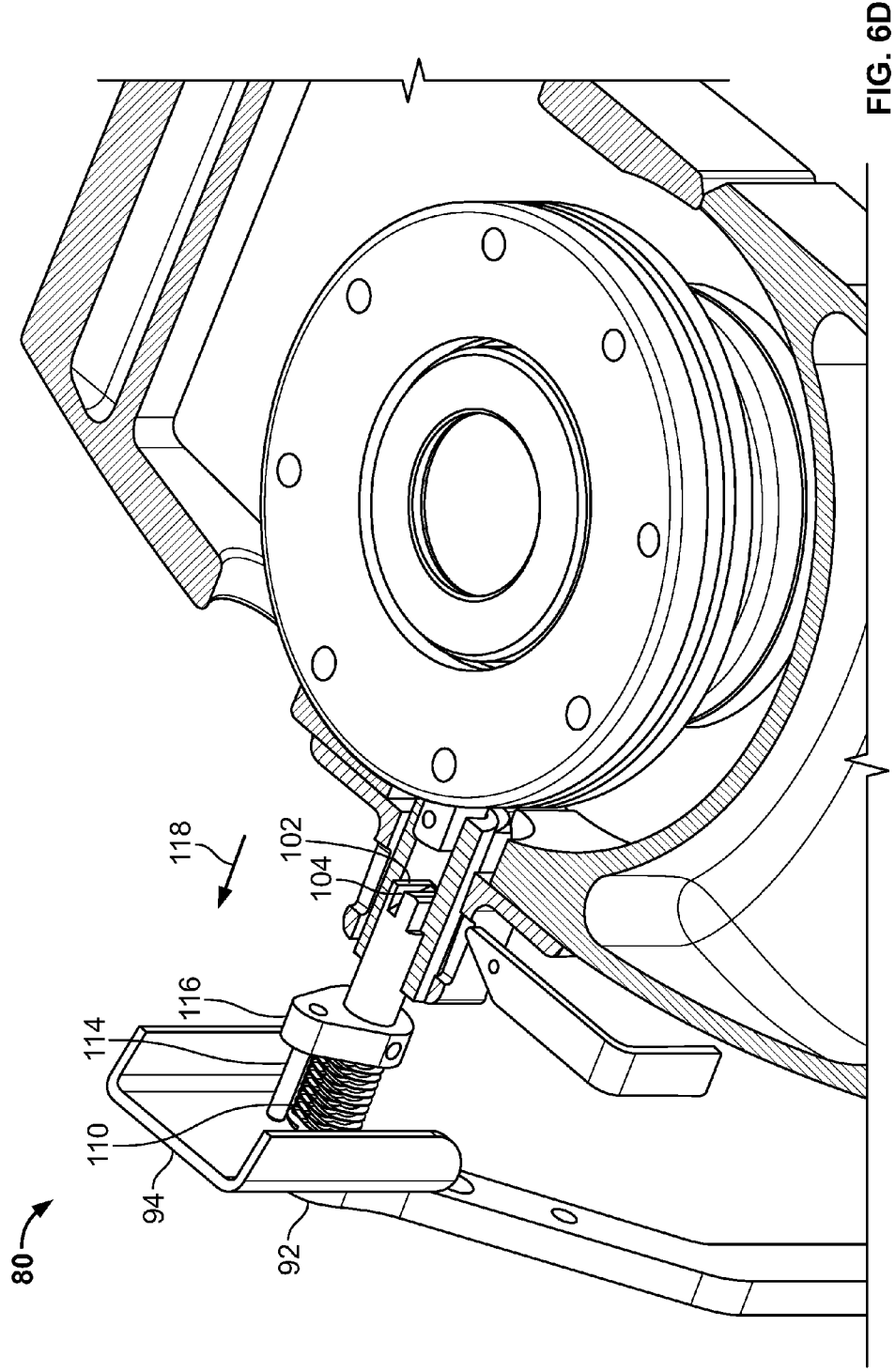

A second embodiment of the disengaging handle assembly is indicated in general at 80 in FIGS. 5-6D. As with the embodiments of FIGS. 1-4, as illustrated in FIG. 5, and as known in the art, a bottom outlet valve (BOV) 82 is attached to the bottom of the tank 84 of a railroad tank car. A skid 86 is positioned so as to surround and protect the BOV. The BOV includes a valve stem 87 (FIG. 6A) that is provided with a BOV coupler 88.

As illustrated in FIGS. 5 and 6A, and explained in greater detail below, this embodiment uses a slot and taper pin mechanism between the shaft and the BOV to engage and disengage the handle from the BOV, as well as to lock the BOV during train movement.

As illustrated in FIGS. 5 and 6A, the assembly 80 includes a handle 92 that is pivotally secured to the tank by a bracket 94 (partial views of which are provided in FIGS. 6A-6C) and a shaft 98. When the handle is turned, shaft 98 also turns. The shaft includes a tip 102 that is adapted to engage BOV coupler 88 and that features an angled groove 104.

A taper pin 106 has an angled tip 108 corresponding to the angled groove 104 in the tip of the shaft, and is in the position illustrated in FIGS. 5 and 6A during train movement, so that the tip 102 of the shaft 98 is not in engagement with the coupler 88.

In use, the operator pulls out the taper pin 106 to unlock the disengaging handle assembly so that it may engage the BOV. A wave compression spring 110 pushes the shaft into the engaged position when the taper pin is removed. The disengaging handle assembly is shown with the taper pin 106 partially removed in FIG. 6B.

With reference to FIG. 6C, the handle assembly is engaged with the BOV when flats ground into the tip 102 of the shaft are inserted into the matching hole of the BOV coupler 88. The operator then turns the handle 90° counter-clockwise, as illustrated by arrow 112 of FIG. 6C, opening the BOV. As a result, the handle 92 is in the position illustrated in FIG. 6D.

A locator pin 114 is attached to the shaft by locator pin holder 116 and engages locator pin hole 117 (FIGS. 5 and 6A-6C) formed in bracket 94 when the disengaging handle assembly 80 is in the disengaged configuration illustrated in FIGS. 5 and 6A. As illustrated in FIG. 6D, the locator pin 114 ensures that the shaft cannot be moved in the direction of arrow 118, since the locator pin is not aligned with the locator pin hole 117, so that the tip 102 of the shaft of the handle assembly cannot be disengaged from the BOV coupler 88 unless the BOV is closed, preventing the operator from accidentally leaving the BOV open during train movement.

When unloading is finished, the operator replaces the taper pin 106, by reversing the steps illustrated in FIGS. 6A-6C, so that the tip 102 of the shaft of the disengaging handle assembly is disengaged from the BOV coupler 88 and the BOV is effectively locked in the closed condition. The locator pin also locks the handle in place during train movement.

The embodiment of FIGS. 5-6D can be converted to a remote-operated handle by extending the shaft (98 of FIGS. 6A-6D) so the handle is accessible from the side of the tank car as illustrated in FIG. 4 for the previous embodiment.

Figure 7:
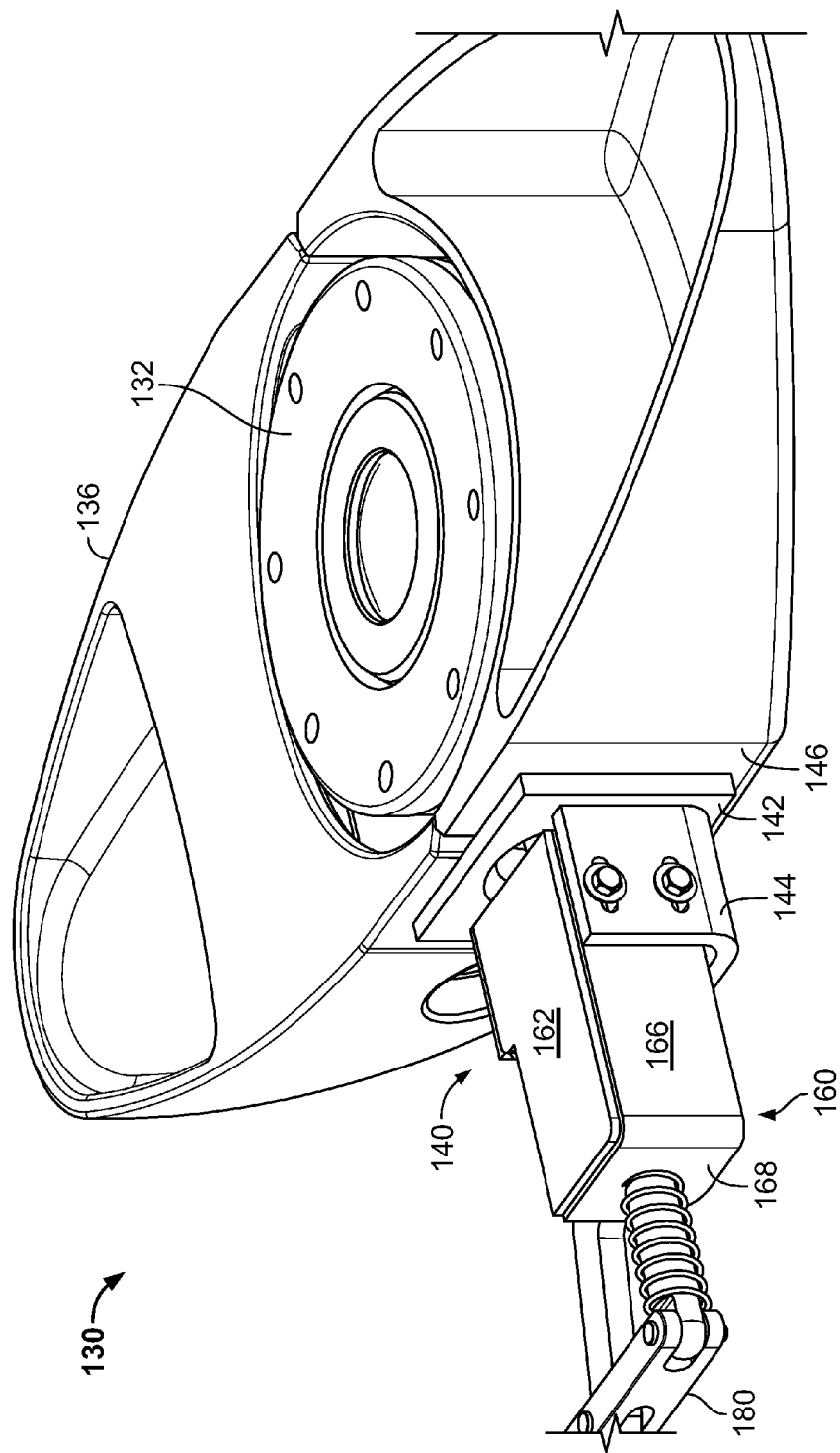
FIG. 7 is a top perspective view of third embodiment of the disengaging handle assembly of the invention in a disengaged configuration.
Figure 8:
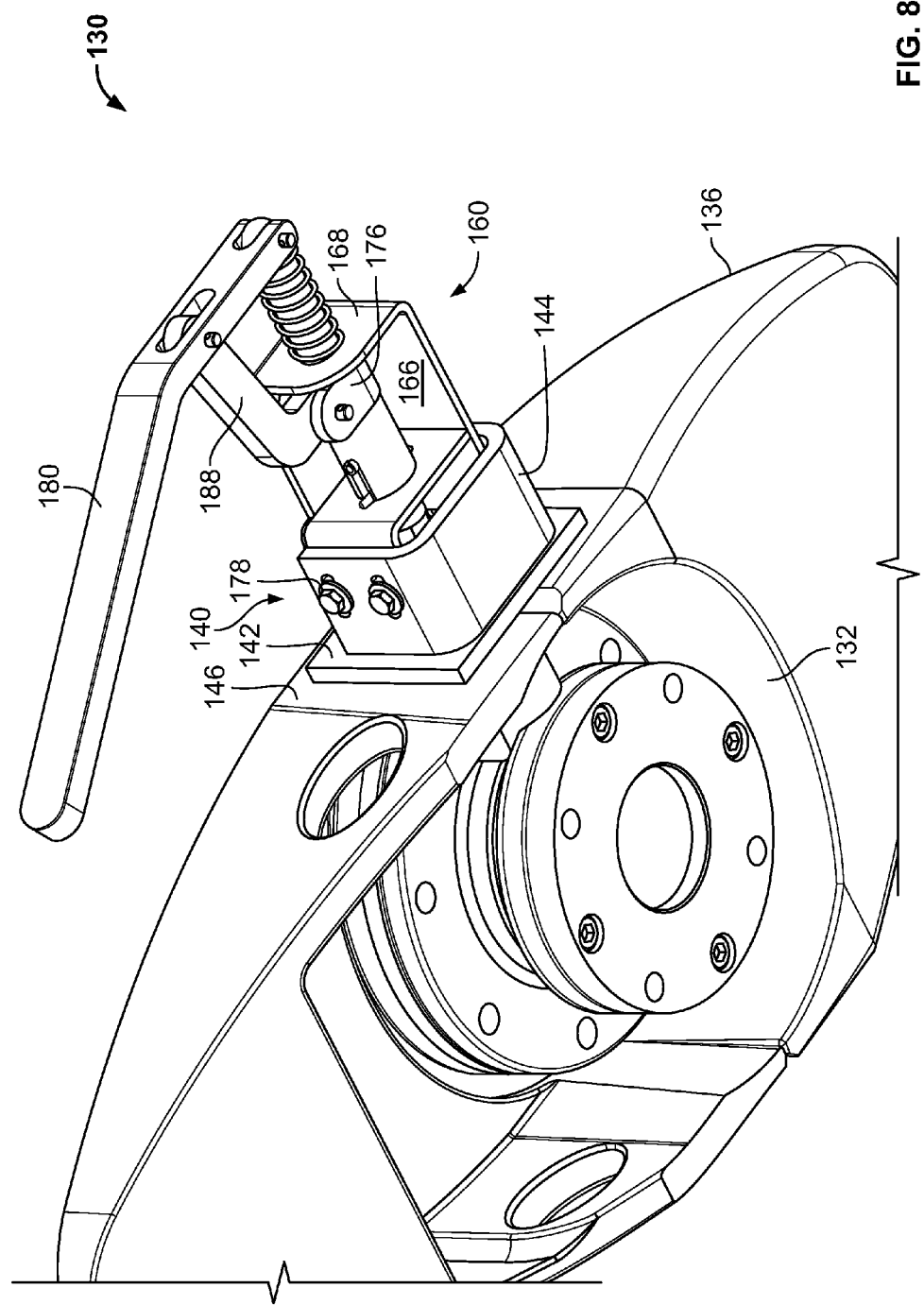
FIG. 8 is a bottom perspective view of the disengaging handle assembly of FIG. 7.
Figure 9:
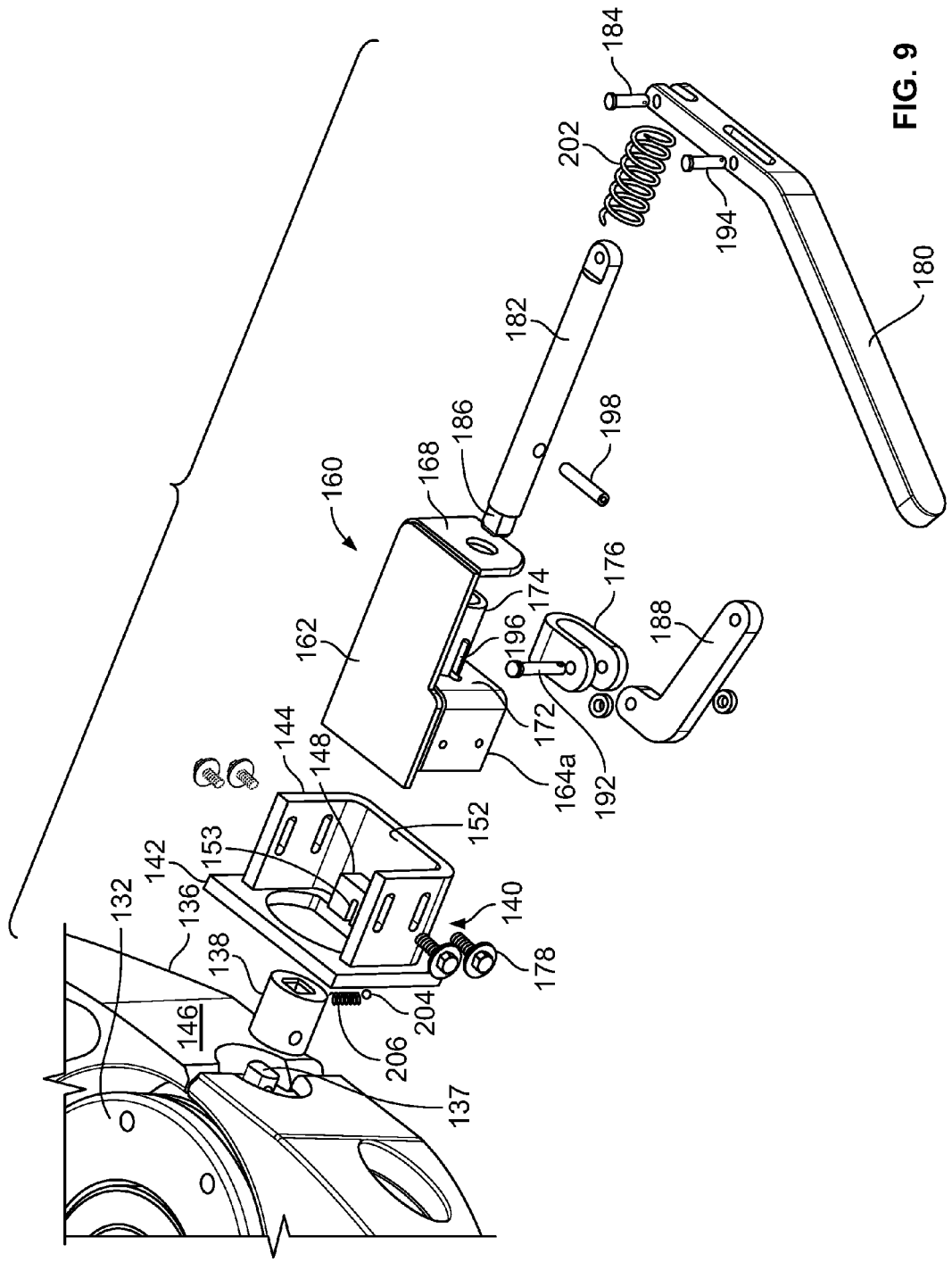
FIG. 9 is an exploded top perspective view of the disengaging handle assembly of FIG. 7.

A third embodiment of the disengaging handle assembly of the invention is indicated in general at 130 in FIGS. 7 and 8. As described for previous embodiments, a bottom outlet valve (BOV) 132 is attached to the bottom of the tank of a railroad tank car (such as tank 14 of FIGS. 1 and 4). A skid 136 is positioned so as to surround and protect the BOV. As illustrated in FIG. 9, the BOV includes a valve stem 137 that is provided with a BOV coupler 138.

As illustrated in FIGS. 7-9, the disengaging handle assembly 130 is mounted to the side of the skid 136 by a mounting bracket, indicated in general at 140, that includes a panel portion 142 and a U-shaped flange portion 144. During installation of the disengaging handle assembly, the panel portion 142 of the mounting bracket is welded to a side wall 146 of the skid 136. As illustrated in FIG. 9, a stop block 148 is secured to a bottom 152 of the mounting bracket flange portion. The stop block 148 features a channel 153, the purpose for which is explained below.

Figure 10:
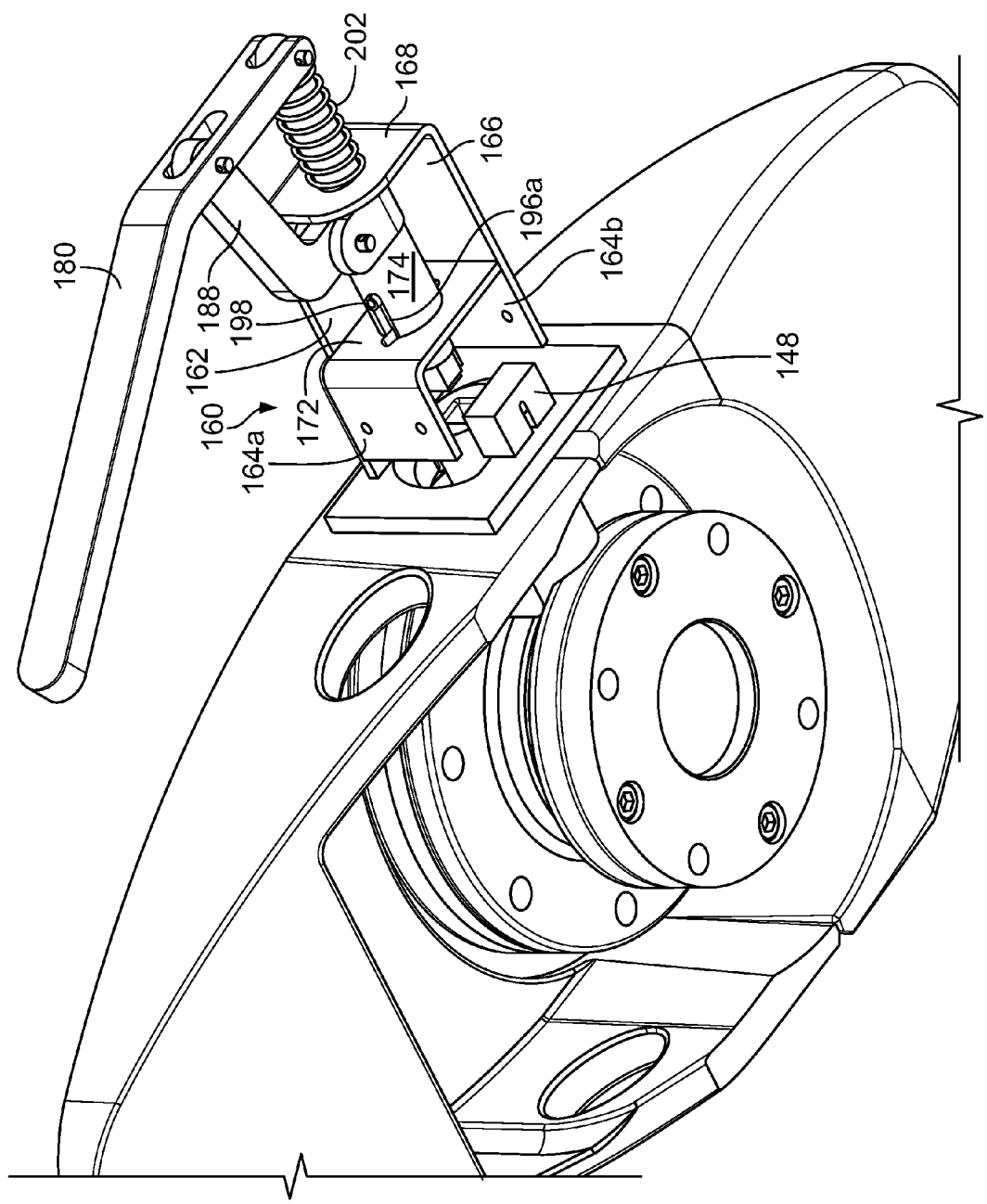
FIG. 10 is a bottom perspective view of the disengaging handle assembly of FIG. 8 with the mounting bracket flange omitted for clarity.

A shaft support assembly, indicated in general at 160 in FIGS. 7-10, is used to mount a rotating handle and handle shaft to the BOV skid 136. As shown in FIGS. 9 and 10, the shaft support assembly includes a top plate 162 to which are attached a pair of mounting tabs 164a and 164b. Mounting tab 164b extends to form a side wall 166 and an outer wall 168. Mounting tab 164a extends and is curved to form an inner wall 172. A tubular shaft guide 174 is secured by a proximal end to the inner wall 172. A U-shaped linkage bracket 176 is positioned between, but free to pivot with respect to, the distal end of the tubular guide shaft 174 and the outer wall 168 and, as explained below, is held in place by the handle shaft.

The components of the shaft support assembly 160 are preferably formed of steel and are welded together, but other materials and attachment methods may alternatively be used.

With reference to FIGS. 8 and 9, the mounting tabs 164a and 164b of the shaft support assembly 160 are secured to the U-shaped flange portion 144 of mounting bracket 140 via bolts 178 that engage corresponding openings in the two components. Of course alternative fastening arrangements may be used.

As shown in FIGS. 9 and 10, a handle 180 is pivotally attached to the distal end of a shaft 182 by pin 184. The proximal end of the shaft is provided with a tip 186 that is sized and shaped to removably engage the coupler 138 of the BOV, as explained below. A four-bar linkage is built into the handle to engage and disengage the handle from the BOV. In addition to the proximal portion of the handle 180, a portion of the shaft 182, the four-bar linkage includes a link 188 and the U-shaped linkage bracket 176. The link 188 is pivotally attached at one end to the U-shaped linkage bracket 176 via pin 192 and at the other end to handle 180 by pin 194. The U-shaped linkage bracket 176 receives the shaft 182 and is sized so that the shaft may slide with respect to the bracket.

Shaft 182 pivots within and slides horizontally through an opening formed in outer wall 168, a keyway opening formed in inner wall 172 and the tubular shaft guide 174. The tubular guide shaft 174 features a pair of opposing slots 196. A pin 198 passes through the shaft in a fixed fashion and extends through the slots 196 of the tubular shaft guide. A compression coil spring 202 is sized to receive the shaft 182 and is engaged at one end by the proximal end of handle 180 and the outer surface of outer plate 168. As a result, the coil spring 202 urges the handle and shaft into the disengaged position illustrated in FIGS. 7, 8, 10 and 11A.

Figure 11A:
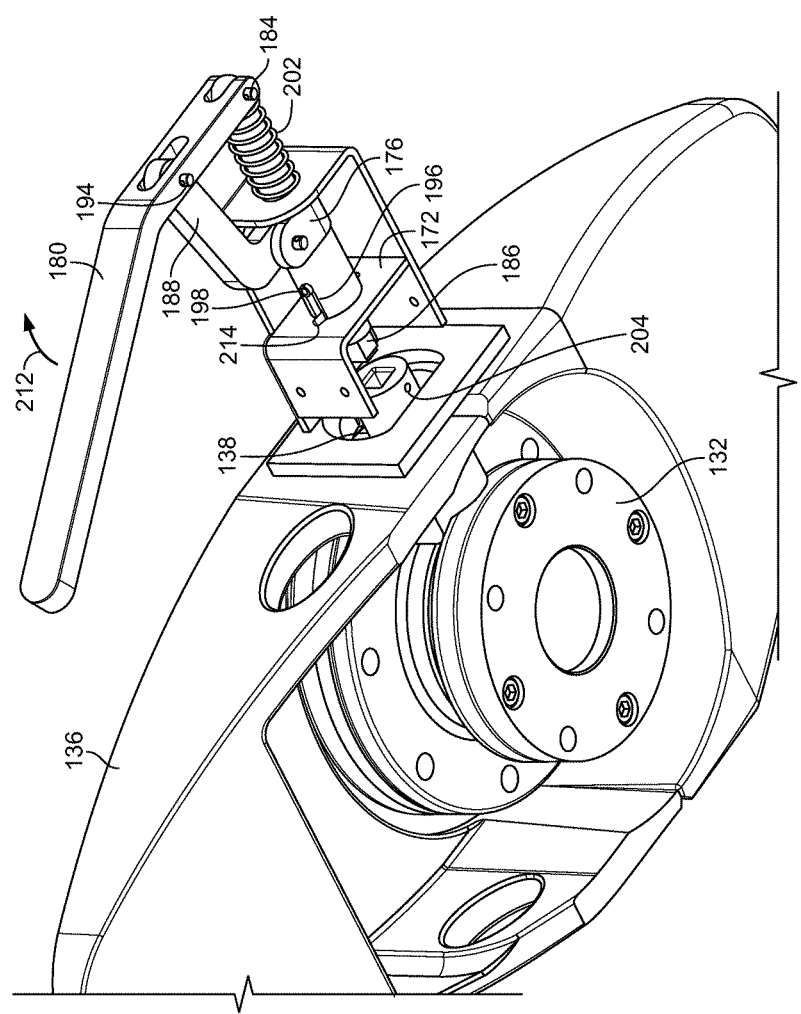
FIGS. 11A-11C are bottom perspective views of the disengaging handle assembly of FIGS. 7-10 with the mounting bracket flange and stop block omitted for clarity and illustrating the disengaging handle assembly in the disengaged, engaged (with BOV closed) and engaged (with BOV open) configurations, respectively.

With reference to FIG. 9, the coupler 138 is provided with a spring pin that includes a ball 204 and a compression coil spring 206. As illustrated in FIG. 11A, the compression coil spring urges the ball 204 downward so that it extends out of an opening formed in the bottom of the coupler 138. The spring pin ball 204 (of FIGS. 9 and 11A) engages the channel 153 of the stop block 148 (of FIG. 9) when the BOV is in the closed configuration. As a result, the BOV will not accidently open due to vibrations or shocks when the tank car is in transit. This BOV lock, however, may be easily overcome when the BOV is actuated via the handle 180 and shaft 182 as follows.

Use of the disengaging handle assembly will now be explained with regard to FIGS. 11A-11C.

Starting with the disengaging handle assembly in the disengaged configuration or position of FIG. 11A, where the BOV is in the closed condition, the operator pulls on the handle 180, in the direction of arrow 212 of FIG. 11A. This pushes the tip 186 of the shaft into the BOV coupler 138, against the urging of spring 202, so that the handle is coupled to the BOV. More specifically, the handle is engaged when flats ground into the tip 186 of the shaft are inserted into a matching bore or hole in the BOV coupler 138. As a result, the disengaging handle assembly is in the engaged configuration illustrated in FIG. 11B. The BOV 132 is still closed at this time. As the shaft, and thus pin 198, moves towards the BOV 132, the handle 180 rotates about the pin 194 so that a fulcrum is provided so as to facilitate the operation. In addition, the ends of the shaft pin 198 move through the keyway opening 214 formed in the inner wall 172 of the shaft support assembly as they move towards the BOV.

Figure 11B:
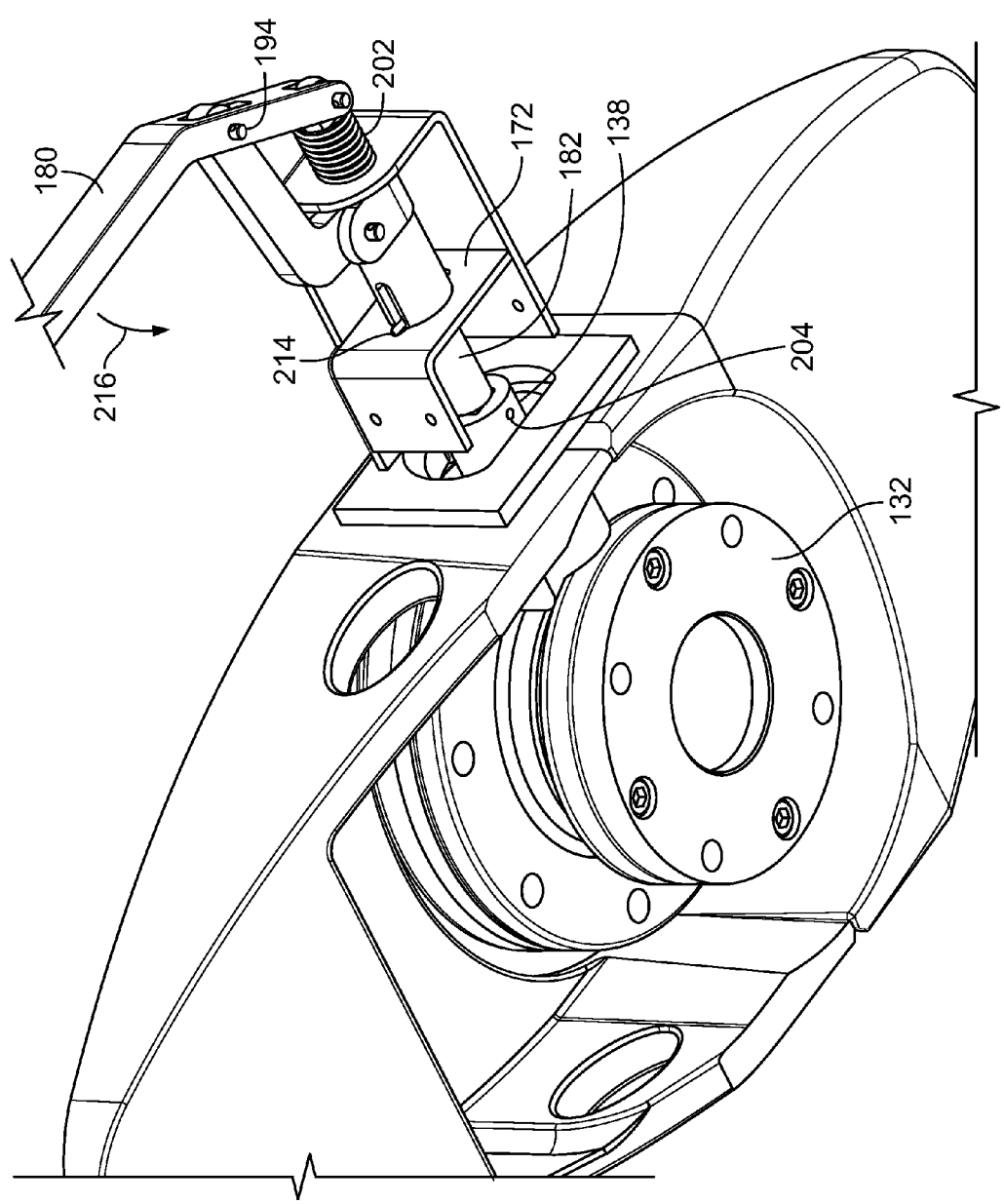
Figure 11C:
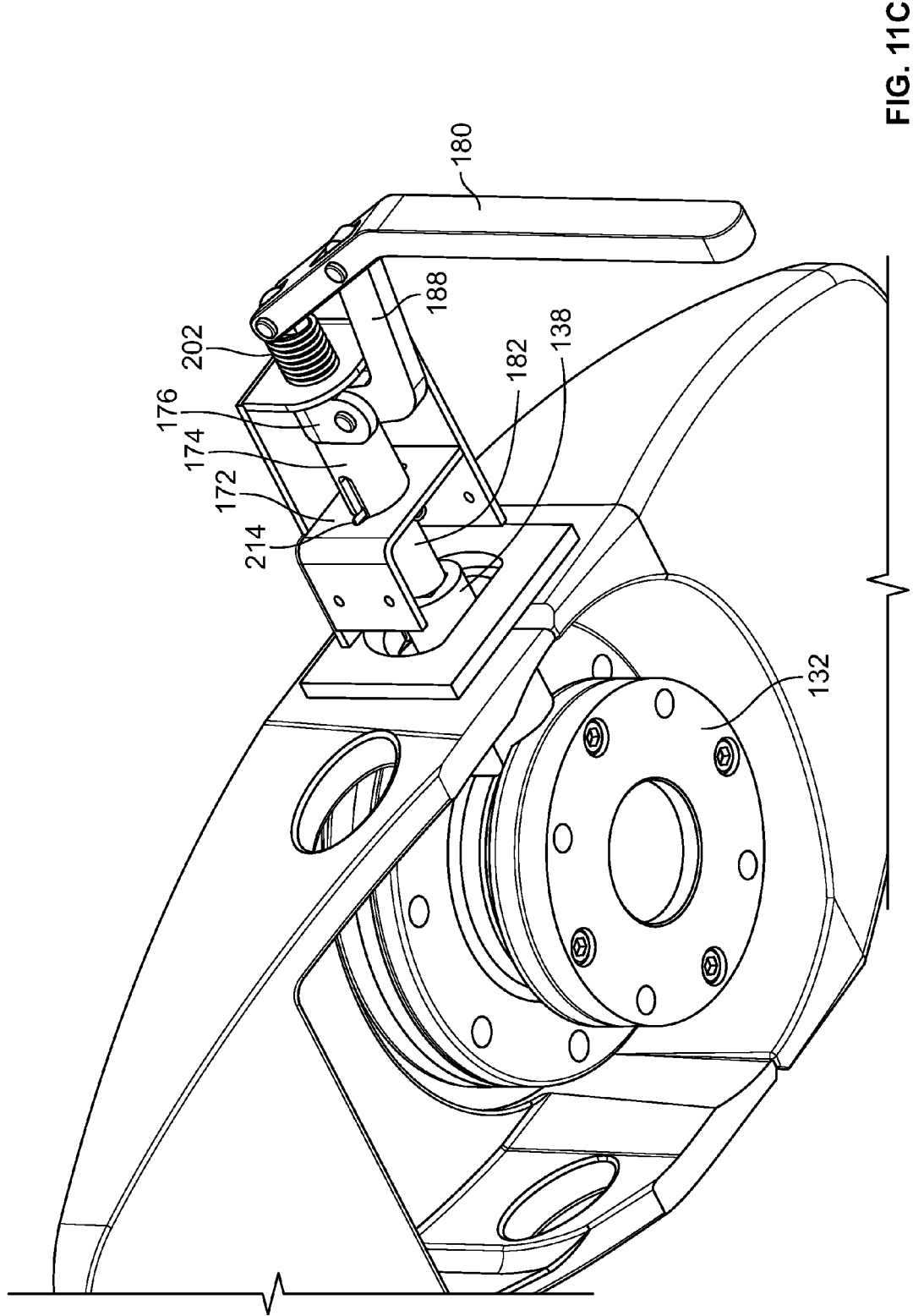

Next, with reference to FIGS. 11B and 11C, the operator turns the handle generally 90° counter-clockwise, as illustrated by arrow 216 in FIG. 11B. This causes the shaft 182 to also rotate so that the coupler 138 is rotated and the BOV 132 is opened. As the coupler 138 rotates, the spring pin ball 204 (FIGS. 11A and 11B) disengages the channel 153 of the stop block 148 (FIGS. 9 and 10). The handle 180 is now in the position illustrated in FIG. 11C. It should be noted that the U-shaped linkage bracket 176 and link 188 have also been rotated with respect to the shaft support assembly. The pin 198 has been rotated with respect to the keyhole opening 214 so that the shaft 182 cannot be slid away from the BOV due to the ends of the pin being blocked by the inner surface of the inner wall 172 of the shaft support assembly. This ensures that the tip of the shaft of the handle assembly cannot be disengaged from the BOV coupler 138 unless the BOV is closed, preventing the operator from accidentally leaving the BOV open during train movement.

The compression spring 202 pushes the handle 180 and shaft 182 back to their default, disengaged positions of FIG. 11A when the handle is pivoted back into the position of FIG. 11B and the BOV is closed.

As illustrated in FIG. 12, the disengaging handle assembly 130 of FIGS. 7-11C can be converted to a remote-operated handle by providing the disengaging handle assembly with an extended shaft 218 so that the handle 180 is accessible from the side of the tank car. More specifically, a cover 222 is positioned over the mounting bracket 140 and features an opening through which the extended shaft 218 passes and may rotate and slide. A drop member 224 is attached to the tank 226 of a railroad tank car or the like. The shaft support assembly 160 is secured to the bottom end of the drop member 224.

Figure 13:
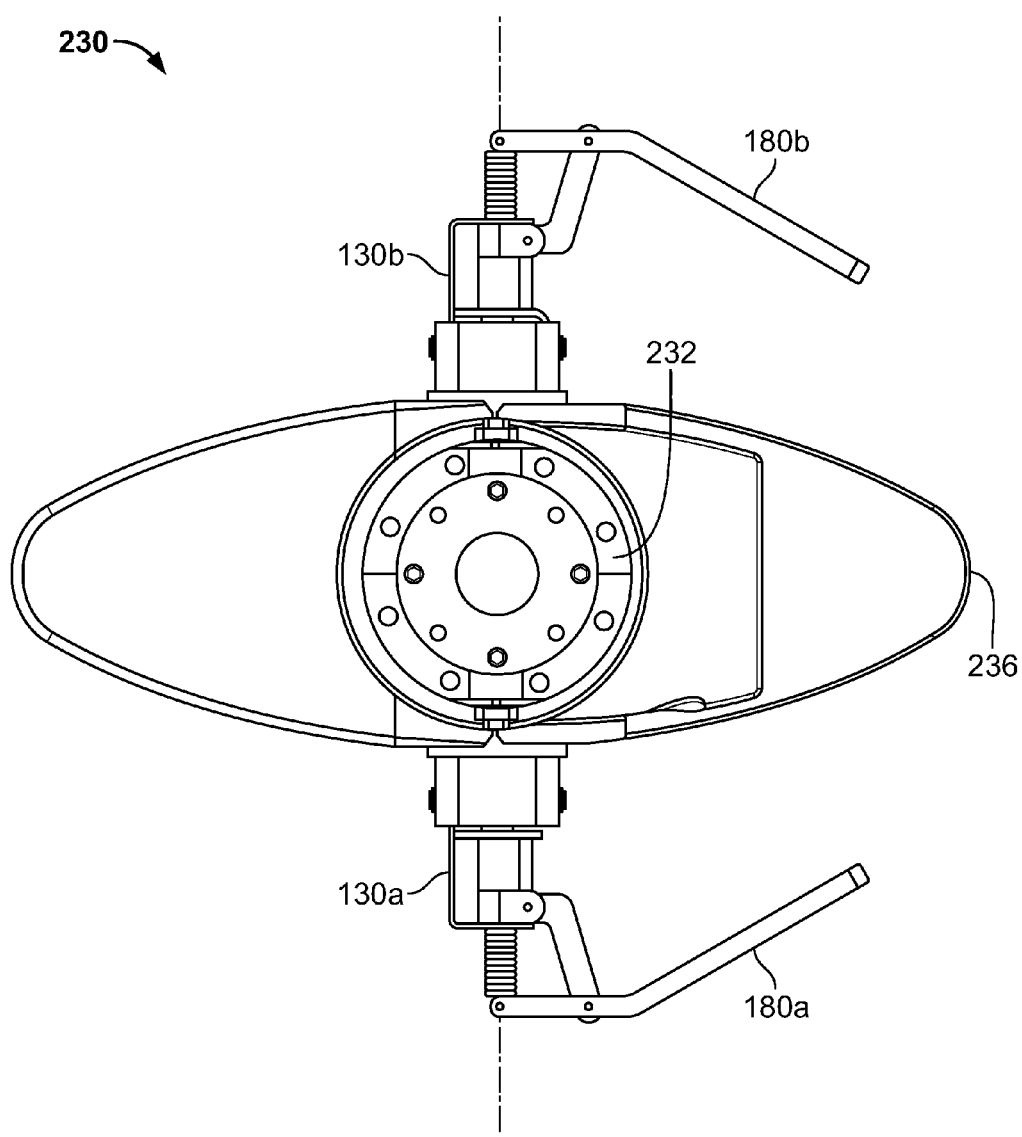
FIG. 13 is a bottom plan view of a fourth embodiment of the disengaging handle assembly of the invention.

With reference to FIG. 13, the bottom of the tank 230 of a railroad tank car may be provided with a BOV 232 that may be opened from either side of the vehicle. In such a situation, the tank car may be provided with two of the disengaging handle assemblies, indicated at 130a and 130b in FIG. 13, with one on each side of the tank car. Each of disengaging handle assemblies 130a and 130b of FIG. 13 may have the construction of any of the disengaging handle assembly described above with regard to FIGS. 7-11C. Such an arrangement permits the BOV 232 to be opened by actuation of either handle 180a or 180b. Of course the embodiments of the disengaging handle assemblies of FIGS. 1-6D could be substituted for the embodiment 130 of FIGS. 7-11C. In addition, the disengaging handle assemblies 130a and 130b could both be configured for remote operation, such as in the manner illustrated in FIGS. 4 and 12.

While the preferred embodiments of the invention have been shown and described, it will be apparent to those skilled in the art that changes and modifications may be made therein without departing from the spirit of the invention, the scope of which is defined by the appended claims.

What is claimed is:

1. A handle assembly for an outlet valve for a tank, where the outlet valve has a coupler that is actuated to open and close the outlet valve, the handle assembly comprising:
   a. a handle;
   b. a shaft attached to the handle and having a tip; and
   c. a bracket adapted to mount the shaft to the tank so that the shaft is pivotally mounted with respect to the tank and movable with respect to the outlet valve between an engaged position where the tip of the shaft engages the coupler and a disengaged position where the tip of the shaft is disengaged from the coupler, the disengaged position defined as a mechanical separation between the shaft and the coupler thereby eliminating a mechanical connection between the handle and the outlet valve, and further wherein the mechanical separation includes full disengagement between the shaft and the coupler and that when there is the mechanical separation, there is no operational capability to open the outlet valve.

2. The handle assembly of claim 1 further comprising a spring positioned between the bracket and the shaft, said spring urging the shaft into the disengaged position.

3. The handle assembly of claim 2 wherein the bracket includes a mounting bracket adapted to attach to a skid of the outlet valve and a shaft support attached to the mounting bracket, where the shaft support includes a wall and the spring is a compression coil spring positioned between the wall and a distal end of the shaft.

4. The handle assembly of claim 3 wherein the handle is pivotally attached to the distal end of the shaft so as to engage the compression coil spring.

5. The handle assembly of claim 1 wherein the handle is pivotally attached to the distal end of the shaft and further comprising a linkage bracket pivotally mounted to the bracket and a link having a first end pivotally attached to the linkage bracket and a second end pivotally attached to the handle so the link provides a fulcrum when the handle is pivoted about the distal end of the shaft.

6. The handle assembly of claim 5 wherein the linkage bracket is generally U-shaped and wherein the linkage bracket receives the shaft in both a sliding and rotational fashion.

7. The handle assembly of claim 1 wherein the bracket includes a mounting bracket adapted to attach to a skid of the outlet valve and a shaft support attached to the mounting bracket.

8. The handle assembly of claim 7 wherein the shaft support includes a shaft guide having a slot and further comprising a pin attached to the shaft, said pin traversing the slot of the shaft guide as the shaft is moved between the engaged and disengaged positions.

9. The handle assembly of claim 8 wherein the shaft support includes a wall having a keyway opening through which the pin passes when the shaft is moved into the engaged position, said wall preventing the shaft from being moved into the disengaged position after the shaft is rotated from an initial position corresponding to the disengaged position.

10. The handle assembly of claim 9 wherein the shaft guide includes a tube that is attached to the wall.

11. The handle assembly of claim 8 wherein the shaft guide includes a tube that is attached to a wall.

12. A vehicle comprising:
  a. a tank;
  b. an outlet valve positioned on the tank,
  c. a coupler attached to the outlet valve that rotates between an open position that corresponds to an open configuration of the outlet valve and a closed position that corresponds to a closed configuration of the outlet valve;
  d. a handle assembly including:
    i) a handle;
    ii) a shaft attached to the handle and having a tip;
    iii) a bracket mounted to the tank and to which the shaft is pivotally mounted;
    iv) said shaft movable between an engaged position where the tip of the shaft engages the coupler and a disengaged position where the tip of the shaft is disengaged from the coupler, the disengaged position defined as a mechanical separation between the shaft and the coupler thereby eliminating a mechanical connection between the handle and the outlet valve, and further wherein the mechanical separation includes full disengagement between the shaft and the coupler and that when there is the mechanical separation, there is no operational capability to open the outlet valve.

13. The vehicle of claim 12 further comprising a skid generally surrounding the outlet valve and wherein the bracket is attached to the skid.

14. The vehicle of claim 12 wherein the bracket includes a stop block with a channel and wherein the coupler includes a spring pin, wherein the spring pin engages the channel of the stop block when the outlet valve is in the closed position.

15. The vehicle of claim 12 further comprising a spring positioned between the bracket and the shaft, said spring urging the shaft into the disengaged position.

16. The vehicle of claim 15 wherein the bracket includes a mounting bracket adapted to attach to a skid of the outlet valve and a shaft support attached to the mounting bracket, where the shaft support includes a wall and the spring is a compression coil spring positioned between the wall and a distal end of the shaft.

17. The vehicle of claim 12 wherein the handle is pivotally attached to the distal end of the shaft and further comprising a linkage bracket pivotally mounted to the bracket and a link having a first end pivotally attached to the linkage bracket and a second end pivotally attached to the handle so the link provides a fulcrum when the handle is pivoted about the distal end of the shaft.

18. The vehicle of claim 17 wherein the linkage bracket is generally U-shaped and wherein the linkage bracket receives the shaft in both a sliding and rotational fashion.

19. The vehicle of claim 12 wherein the bracket includes a shaft guide having a slot and further comprising a pin attached to the shaft, said pin traversing the slot of the shaft guide as the shaft is moved between the engaged and disengaged positions.

20. The vehicle of claim 19 wherein a shaft support includes a wall having a keyway opening through which the pin passes when the shaft is moved into the engaged position, said wall preventing the shaft from being moved into the disengaged position after the shaft is rotated from an initial position corresponding to the disengaged position.

* * * * *